US006721661B2

(12) United States Patent
Anstey et al.

(10) Patent No.: US 6,721,661 B2
(45) Date of Patent: Apr. 13, 2004

(54) METHOD OF DISTINGUISHING TYPES OF GEOLOGIC SEDIMENTATION

(76) Inventors: Nigel A. Anstey, Cedar Lodge, Glen Mora, Isle of Man, British Isles IM7 1HG (GB); Ronan Francis O'Doherty, 124 Hillside, Greystones, County Wicklow (IE)

(*) Notice: Subject to any disclaimer, the term of this patent is extended or adjusted under 35 U.S.C. 154(b) by 0 days.

(21) Appl. No.: 10/335,478

(22) Filed: Dec. 31, 2002

(65) Prior Publication Data

US 2003/0144796 A1 Jul. 31, 2003

(30) Foreign Application Priority Data

Jan. 4, 2002 (GB) .............................................. 0200113

(51) Int. Cl.$^7$ ................................................ G06F 19/00
(52) U.S. Cl. ................................................ 702/8; 703/5
(58) Field of Search ........................... 702/8, 16, 35; 367/35; 703/5

(56) References Cited

U.S. PATENT DOCUMENTS 5,999,485 A * 12/1999 Anstey et al. ................. 367/35

* cited by examiner

*Primary Examiner*—John E. Barlow
*Assistant Examiner*—Victor J. Taylor
(74) *Attorney, Agent, or Firm*—Thomas L. Bohan; Patricia M. Mathers (57) ABSTRACT

A method for interpolating the environment and geological age at all levels in a borehole from information provided by a limited number of depths and the use of a synthetic stratigraphic cross-section for the interval between these depths. In hydrocarbon exploration, a borehole provides a suite of logs, plus estimates of geologic age at a number of spaced markers. This method uses a sea-level cycle chart, a calculation of subsidence from the thickness of the interval, and postulated values for several variables. If it is known that the supply of sediment always exceeded the available accommodation during deposition, the corresponding synthetic cross-section may then be optimized for geological plausibility (as gauged by visual observation or quantitative criteria) by perturbing the postulated variables and iterating the calculations. Otherwise, the additional step of determining where in the interval the accommodation exceeded the sediment is performed by comparing the signs of the slopes of an observed log estimating sediment grain size and a calculated log estimating layer thickness.

18 Claims, 3 Drawing Sheets

METHOD OF DISTINGUISHING TYPES OF GEOLOGIC SEDIMENTATION

BACKGROUND INFORMATION

This application claims benefit of UK application Number GB 0200113.0 filed on Jan. 4, 2002, by the same inventors.

FIELD OF THE INVENTION

This invention is concerned with a method for distinguishing between rocks laid down in different depositional environments. It is of particular utility in exploration for oil and gas and represents an extension of the invention described and claimed by the same inventors in U.S. Pat. No. 5,999,485, which is hereby incorporated herein.

DESCRIPTION OF THE PRIOR ART

When a borehole is drilled in the search for oil and gas, it is common practice to lower measuring instruments ("logging tools") into the hole, and to record the observed variations ("logs") of some physical property of the rocks (such as density, or acoustic velocity, or radioactivity) as a function of depth in the hole. The interpretation of such logs, and the making of inferences about the geology penetrated by the borehole, is an advanced art. However, other advances are desirable, and one matter where advance is still required is in the use of the logs to define the depositional environment in which the rocks were laid down. In particular, additional methods are required to distinguish between rocks laid down where the rate of supply of sediment was greater than, or less than, the rate of increase of accommodation space available to be filled by sediment. For example, coastal sedimentation (of the type that may later yield hydrocarbon reservoir rocks) is generally into shallow water, where the sediment supply is more than sufficient to fill any available accommodation; on the other hand, slope sedimentation (of the type that may later yield hydrocarbon source rocks) is into deepening water, where the accommodation space is large and the sediment not already deposited to landward is not sufficient to fill it. In the prior art this distinction is sought in a study of fossil types, mineral inclusions, and the logs; particularly important is the gamma-ray log, which often allows a distinction (at least in part) on the basis of sediment grain size.

Major determinants of accommodation space are the subsidence of the depositional surface and variations of sea level. It is known that sea level often has a cyclic component; in effect, this alternately increases and decreases the accommodation made available by subsidence. Present knowledge of the variations of sea level through geologic time is sufficient to contribute to log interpretation, provided that the sea-level cycles (defined in time) can be recognized in the logs (defined in depth).

Also relevant to the background of the present invention is U.S. Pat. No. 5,999,485, to the present inventors. This patent discloses a statistic L offering a convenient measure of the thinness of rock layers. The statistic may be calculated simply and inexpensively, as a function of depth, from the logs.

BRIEF SUMMARY OF THE INVENTION

Accordingly it is an object of the present invention to determine whether a particular portion of a log represents sediments deposited under conditions where sediment exceeded accommodation, or accommodation exceeded sediment.

It is a further object to associate a particular portion of a log, and the sediments it represents, with a phase of one or more sea-level cycles.

It is a further object to use a log, plus knowledge of sea-level variations through time, to construct a synthetic stratigraphic cross-section that is consistent with both, and that indicates the likely depositional environment of the sediments traversed by the log.

These objects are achieved in part by relating the thickness of a rock layer to the physical properties of the layer, using the following steps in combination (a) measuring one or more appropriate physical properties of rock layers as a function of depth in the earth, where "appropriate" refers to those physical properties that display a cyclic aspect in the sense set out in U.S. Pat. No. 5,999,485;

(b) using the measurements of such properties to obtain an estimate of the rock layer thickness as a function of depth in the earth;

(c) using this estimate to determine the rate of change of the rock layer thickness as a function of depth in the earth ("rock-layer-thickness slope");

(d) using the physical-property measurements to determine the rate of change of each of the measured physical properties as a function of depth in the earth ("physical-property slope");

(e) identifying zones in the rock as first-type zones if within those zones sign of the rock-layer-thickness slope is the same as a physical-property slope and as second-type zones if these signs are opposite to one another, and (f) ascribing to one type of these zones the characteristic of sediment exceeding accommodation and to the other type the characteristic of accommodation exceeding sediment.

Part (f) of the procedure described in the preceding paragraph is so phrased because the particular physical property selected for measurement and analysis determines which of the two types of zones defined is characterized by sediment exceeding accommodation and which by accommodation exceeding sediment.

The objects are further achieved by constructing a synthetic stratigraphic cross-section through a borehole, and thus determining the likely depositional environment of the stratigraphic intervals on the cross-section, using the following steps in combination, using as initial inputs trial values postulated for subsidence rate, sediment supply, sediment type, and equilibrium angle:

(a) identifying marker levels within the borehole, at each of which the geological age of deposition is known from biostratigraphical evidence;

(b) for each interval between such markers, using the interval thickness and a sea level cycle chart to obtain the local variation of sea level relative to the base of that interval, initially postulating that the observed subsidence rate was constant (the total subsidence within the interval being constrained at the end-points of the interval);

(c) postulating a cross-sectional form of a depositional substrate for the interval, which substrate may conform to the upper depositional surface constructed for one or more previous intervals;

(d) postulating a reasonable rate of supply of sediment, initially taking it to be constant during the chosen interval;

(e) postulating an initial range of a sediment property, such as grain size, likely to induce sorting during the processes of sediment transport and deposition;

(f) postulating an initial value for the equilibrium angle of a non-horizontal depositional surface for the sediment characteristics postulated above under conditions where accommodation exceeds sediment supply;

(g) using the method of the paragraph immediately above to identity those portions of the interval where sediment exceeded accommodation, and where accommodation exceeded sediment, respectively;

(h) using the inputs postulated in (b) through (f) above to construct one or more synthetic stratigraphic cross-sections of the rocks deposited in the chosen interval, such cross-sections being limited to those that are consistent with the actual data inputs from the borehole;

(i) by graphic or visual or other means, assessing the geological plausibility of such cross-section or cross-sections;

(j) perturbing each of the postulated inputs, iterating the calculation toward improved geological plausibility, finally selecting the synthetic stratigraphic cross-section deemed to be most geologically plausible.

DETAILED DESCRIPTION OF THE INVENTION

In exploration for oil and gas, a recurring problem is to define the depositional environment of sediments encountered at a specific depth in a borehole, using coarse biostratigraphical data and a suite of borehole logs. Effectively, this is seeking a two-dimensional or three-dimensional solution from one-dimensional inputs. In the prior art the solution of this problem has been much aided by the techniques of sequence stratigraphy; such techniques often involve seismic data, which directly add the second and third dimension. However, the benefit from seismic data is limited; many reservoir features are below seismic resolution, and seismic techniques are poor at revealing stratigraphic unconformities unless the angularity between sediments above and below is very marked.

According to the present invention, a solution may be provided, or refined, by constructing a synthetic stratigraphic cross-section (in two dimensions) that is compatible with the borehole data (in one dimension).

Figure 1:
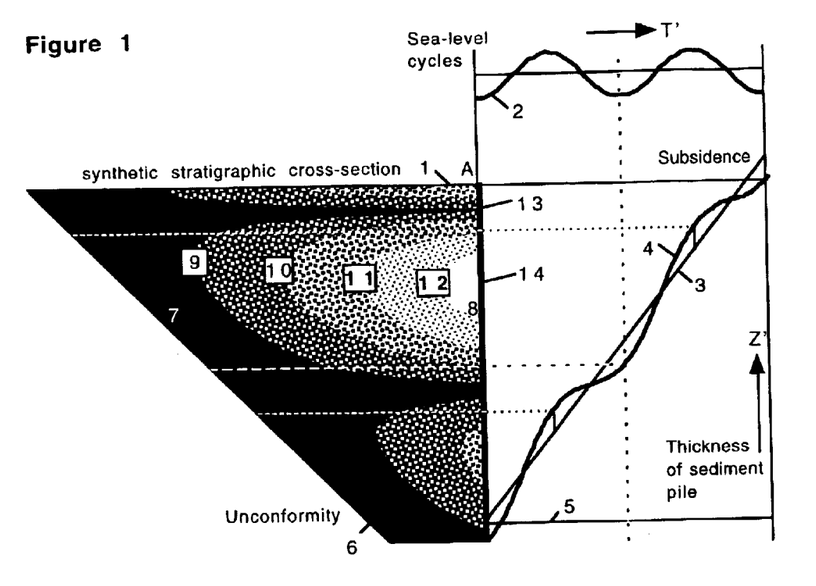
FIG. 1 illustrates the construction of a synthetic stratigraphic cross-section from a known sea-level variation and a known subsidence, when sediment everywhere exceeds accommodation.

FIG. 1 is a simplified form of a general construction for the stratigraphic cross-section corresponding to any given variation of sea level, under conditions in which sediment exceeds accommodation. The synthetic cross-section is exemplified at 1, for a sea-level variation exemplified as having two equal cycles 2, in the presence of subsidence exemplified at 3. For this illustrative case, all sediments are assumed to be siliciclastic, and injected into the left side of the figure at constant rate. The figure has a very large vertical exaggeration (in the order of 100).

The position 4 of sea level as a function of time, relative to the base 5 of the interval considered, is given by the algebraic addition of the sea-level curve 2 to the subsidence 3. In this illustration, the base 5 is seen to be subsiding into the earth faster than the fastest fall of sea level, so that the slope of the curve 4 is always positive.

Since it has been assumed that sediment exceeds accommodation, all deposition is in shallow water, on a near horizontal surface. Then curve 4 may be taken as the height of the sediment pile, so that the curve becomes an aggradation curve; its (positive) slope is the rate of deposition.

When the slope of aggradation curve 4 is large, denoting very rapid deposition, almost the full volume of sediments entering the figure at the inclined unconformity surface 6 can be accommodated (in FIG. 1) within the horizontal extent of cross-section 1. Where the slope is small, the deposition of sediments continues far to the right of cross section 1.

Ordinarily the sediments are sorted, by grain size or other characteristic, during transport across the near-horizontal depositional surface; thus the sediments 7 deposited close to the unconformity surface 6 tend to be coarse-grained, while the sediments 8 transported further basinward (to the right) tend to be finer-grained. This variation of grain size is suggested by contours 9, 10, 11 and 12, representing a gradation from very coarse (left of contour 9), through coarse through medium through fine to very fine (right of contour 12). These contours are seen to migrate landward (to the left) while the depositional rate (the slope of curve 4) is increasing, and basinward (to the right) while it is decreasing.

FIG. 1 is a simplified schematic to illustrate the basic connection between subsidence, sea-level cycles, depositional rate and sediment sorting. Modifications to cope with variable subsidence, variable sediment supply, lateral variation of subsidence and low frequency sea-level drift will be evident to those skilled in the art, as will the loss of section and the generation of unconformity if the slope of aggradation curve 4 becomes negative, and the consequences of a substrate different from that illustrated as unconformity 6. Some of these matters are discussed in an article "Cycles, Layers and Reflections," by the present inventors, published in two parts by the Society of Exploration Geophysicists in their professional magazine The Leading Edge for January and February 2002.

Under the conditions of FIG. 1, the contours 9–12 illustrate that, at any given vertical through the cross-section, there is a formal connection between grain size and the depositional rate of the sediments. Thus a vertical borehole drilled through the rocks under point A would first encounter sediments of increasing grain size and decreasing depositional rate (to 13), then of decreasing grain size and increasing depositional rate (to 14), then of increasing grain size and decreasing depositional rate, then of decreasing grain size and increasing depositional rate, and finally of increasing grain size and decreasing depositional rate (to the base of the cross-section). The sinusoidal cycles of sea level generate nonsinusoidal cycles in the rocks.

These cycles in the rocks are very material to exploration for oil and gas, in that they create a situation where oil and gas generated in a fine-grained source rock (such as at 14) can migrate upwards into a coarse-grained reservoir rock (such as at 13). The generation of such situations at commercial scale typically requires sea-level cycles having periods of the order of 1–5 million years, and relatively large amplitude. However, sea-level cycles also occur with shorter periods (such as 100,000 years), and smaller amplitude. These, superposed on the larger and slower cycles, generate small-scale variations in the rocks in the same way, and are responsible for much of the thin layering that is commonly seen in rocks at outcrop. The vertical wavelength of such thin layering in the earth may be taken as a measure of the depositional rate imposed by the larger and slower cycles.

Therefore the above relation between grain size and depositional rate, at any given vertical and for the conditions of FIG. 1, may be restated as a formal connection between grain size and vertical wavelength of the layering.

The aforesaid U.S. Pat. No. 5,999,485, to the present inventors, discloses how the vertical wavenumber of layering may be estimated from a borehole log by calculating a statistic L within a sliding window as a function of depth, such statistic representing the first moment of the power spectrum of the wavenumber as a function of depth. The value of the statistic L may be interpreted as layer thinness (large L=thin), so that an L-log is a log of layer thinness. Similarly a log of the reciprocal of L (1/L) may be described as a log of layer thickness.

In the present context, then, the relation between the reciprocal statistic 1/L (representing layer thickness) and the gamma-ray or other log (representing grain size) may be taken as an indicator of the conditions of FIG. 1, in which sediment exceeds accommodation. Specifically, where sediment exceeds accommodation a deflection of the gamma-ray log toward fine-grain values may be expected to be accompanied by a deflection of the 1/L log towards thick-layer values.

Figure 2:
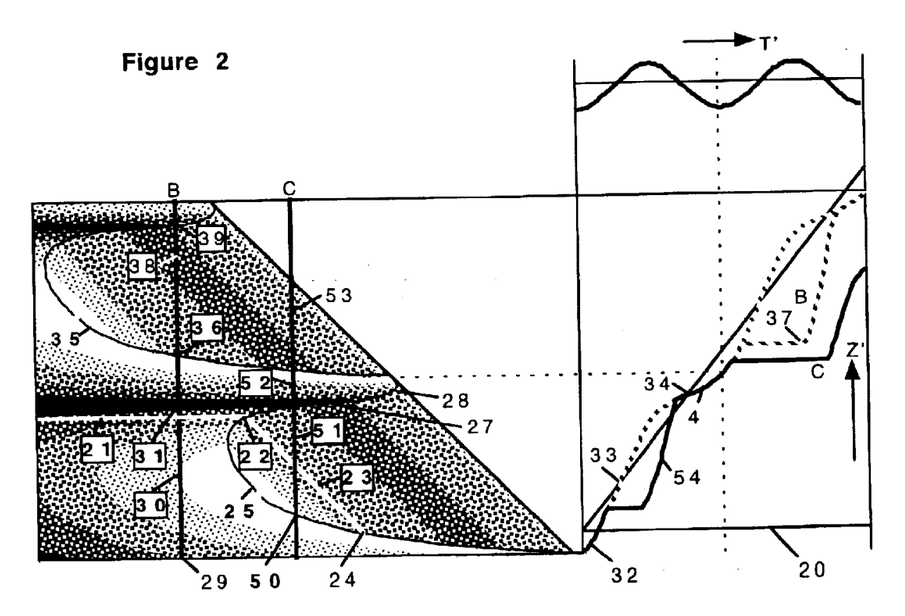
FIG. 2 illustrates the construction of a synthetic stratigraphic cross-section from a known sea-level variation and a known subsidence, under conditions in which sediment exceeds accommodation in some places and accommodation exceeds sediment in others.

FIG. 2 extends FIG. 1 to the right, into the region where the accommodation must eventually exceed the supply of sediment. The scale, and the vertical exaggeration, are as for FIG. 1. The sea-level construction 20 to the right is also as for FIG. 1, except that wherever accommodation exceeds sediment it is no longer true that the top of the sediment pile is at or near sea level. As a corollary of this, it is no longer true that deposition is necessarily on a near-horizontal surface; beyond the break-point where sediment supply equals accommodation, the remaining sediments are deposited down a surface inclined to the horizontal at the sediment equilibrium angle.

A typical depositional surface is illustrated (as a white line) at 21–24. To the left, where sediment exceeds accommodation, the depositional surface 21 is near-horizontal, and sediments are deposited with coarser grains to landward (to the left) and progressively less coarse grains to the right. At the break-point 22 the accommodation increases abruptly, and all remaining sediment (generally finer-grained) is dumped down the inclined front 23 at the equilibrium angle. Except insofar as the equilibrium angle varies with grain size and water depth, this depositional surface is close to plane over much of its extent. Further, the sorting by grain size that occurs systematically on the near-horizontal surface 21 changes its nature and becomes less marked beyond the break-point 22. FIG. 2 emphasises this point by showing the limiting case where there is virtually no sorting down the front 23; the sediments represent an even mix of whatever sediments remain after the sorting action along surface 21. Thus these sediments contain only fine-grained material where this type of sedimentation starts (at 25); the sediment begins to contain some coarser material as the break-point moves up to 22; the amount of coarse material reaches a maximum at 27 (which corresponds to the minimum slope of the aggradation curve 4), and then decreases as sea level starts to rise steeply again.

The change that occurs at the break-point 22 affects not only the mix of grain sizes in the sediment, but also the depositional rate. Thus the depositional rate to the left of the breakpoint is strictly limited by the rate of rise of the aggradation curve 4 (sea level plus subsidence), whereas the depositional rate to the right is limited only by the volume of sediment available; it is common for the depositional rate on a front surface such as 23 to be many times larger thaAlong the locus 28 of the break-point, therefore, there is a fundamental change in the relation between grain size (as represented approximately by the gamma-ray log) and depositional rate (as represented approximately by the 1/L log). This is now explored at two specimen locations B and C in FIG. 2n that on near-horizontal surface 21.

Along the locus 28 of the break-point, therefore, there is a fundamental change in the relation between grain size (as represented approximately by the gamma-ray log) and depositional rate (as represented approximately by the 1/L log). This is now explored at two specimen locations B and C in FIG. 2.

Figure 3:
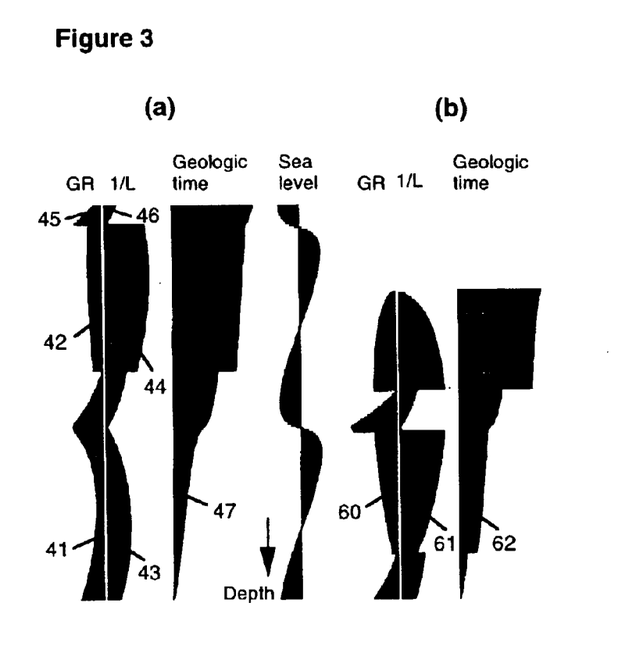
FIG. 3 consists of part (a) showing a juxtaposition of a calculated grain-size log, a calculated layer-thickness log, and a calculated time-depth relation at location B in FIG. 2, and part (b) showing the same juxtaposition for location C in FIG. 2.

FIG. 3a is a juxtaposition of the gamma-ray and 1/L logs as they would be observed in a vertical borehole drilled under location B, and FIG. 3b the same under location C. The vertical scale of FIG. 3 is the same as that of FIGS. 1 and 2.

In FIG. 3a, at location B, the whole of the first cycle of sea level results in deposition with sediment exceeding accommodation. All deposition is on a near-horizontal surface, such as that at 21 in FIG. 2. During this first cycle of sea level the grain size in FIG. 2 is seen to start coarse at 29, to diminish through medium and fine to very fine at 30 (the maximum flooding surface), to increase to very coarse at 31 (the maximum regression of the sea), and then to diminish into the second cycle. The corresponding gamma-ray log 41 in FIG. 3a is seen to follow this variation. The display 41 represents the standard display of a gammaray log (with rightward deflection corresponding to fine grain and leftward deflection to coarse grain), blacked in on the right-hand side of the log trace.

Also during this first cycle of sea level the deposition rate in FIG. 2 (the slope of aggradation curve 4) is seen to start at the subsidence rate at 32, to increase to a maximum 33 at the first upward-going zero-crossing of sea level, to decrease, and then to increase again into the second cycle. The corresponding 1/L display 43 in FIG. 3a is seen to follow this variation For this part of FIG. 3a, therefore, the gamma-ray log 41 and the 1/L log 43 move together. Their slopes may or may not be comparable (depending on many factors), but these slopes, at any selected depth, are generally of the same sign.

According to the invention, this quasi-parallelism is taken as diagnostic of sediment greater than accommodation.

Also at location B, the second cycle of sea level maintains the same property as far as the unconformity surface 35. Just below this unconformity, the sediments have become very fine and the depositional rate quite high. At the unconformity, the fine sediments are depleted, and deposition ceases. There is a significant hiatus before deposition recommences at 36; the duration of this hiatus is represented by the horizontal portion of the new aggradation curve 37. During the hiatus the depth of water below B increases as the separation between curve 4 and the horizontal portion of curve 37.

Deposition below B resumes when the toe of the front sediments, building outwards from the left, reaches this location at 36. This new deposition, being in deep water, is characterized by accommodation exceeding sediment. The sediments are a mix of medium, fine and very fine grains; the coarse and very coarse grains have already been deposited to landward, near sea level. As deposition proceeds, the mix of grain sizes starts to include some coarse grains, and then some very-coarse grains, with the maximum very-coarse content at 38. The corresponding form of the gamma-ray log is shown at 42 in FIG. 3a.

The depositional rate of the sediments above 36 is very large, and even larger higher. The entire sediment thickness between 36 and 39 is deposited while the sediments to landward are thickening by a much smaller amount; this is shown by the steep portion of the new aggradation curve 37. The corresponding form of the 1/L log is shown at 44 in FIG. 3a.

In contradistinction to segments 41 and 43 in FIG. 3a, the segments 42 and 44 are seen to move in opposite directions. Again the slopes may or may not be comparable (depending on many factors), but these slopes, at any selected depth, are generally of opposite sign. According to the invention, this quasi-opposition is taken as diagnostic of accommodation exceeding sediment.

FIG. 3a also shows, at 45 and 46, the restoration of quasi-parallelism when the rapid infill over the range 36–39 in FIG. 2 brings the depositional surface back to near sea level, and sediment once again exceeds accommodation.

A second borehole is also suggested in FIG. 2, at location C. The aggradation curve for location C is shown as full curve 54. The early part of the first cycle yields sediment in excess of accommodation. At 50 the sediment supply ceases, and a hiatus develops; the successions 51 and 53 represent front deposition with accommodation exceeding sediment, and succession 52 represents deposition with sediment exceeding accommodation. The gamma-ray log 60 in FIG. 3b shows the expected variations in grain size, and the 1/L log 61 the expected variations in layer thickness. As before, the slopes of the curves 60 and 61 are generally of the same sign where sediment exceeds accommodation, and of opposite sign where accommodation exceeds sediment.

In FIG. 3a, the curve 47 shows the aggradation of sediment as a function of geologic time, calculated at location B in accordance with the techniques of aforesaid U.S. Pat. No. 5,999,485; in FIG. 3b curve 62 does the same for location C.

Figure 4:
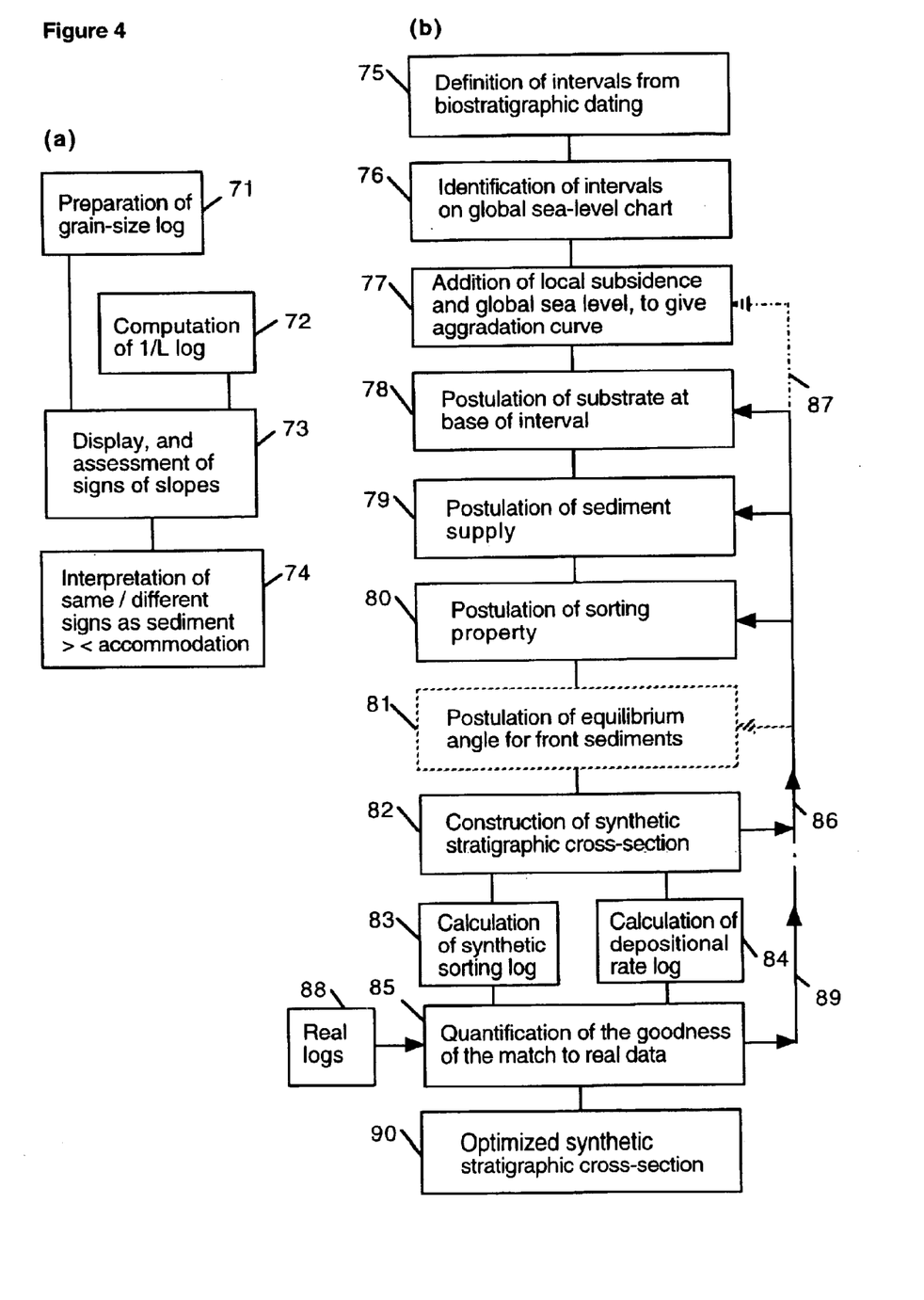
FIG. 4 contains two step-by-step diagrams, part (a) illustrating the method of determining where in an interval the accommodation exceeded the sediment, and part (b) illustrating the construction of a synthetic stratigraphic cross-section using that information.

FIG. 4 illustrates how the above material may be adapted to provide a step-by-step technique for constructing a synthetic stratigraphic cross-section in practice. It is assumed that a borehole has been drilled, that it has been logged with an appropriate suite of logs, and that the geologic age of certain spaced-apart marker sediments has been established from biostratigraphic studies of well cuttings or cores. Now it is desired to construct such a synthetic section as an aid to interpreting the depositional environment in which the sediments in a particular interval were laid down, and to identify the geologic ages of all sediments within such interval.

From FIGS. 1 and 2, it is evident that this is unlikely to succeed unless it can be established in what parts of the interval the deposition was under conditions where sediment exceeded accommodation, and in what parts under conditions where accommodation exceeded sediment. A first part of the technique, therefore, is to construct the equivalent of FIG. 3 for the interval.

In FIG. 4a, the initial stage 71 is the preparation of a suitable log over the interval, such log being interpretable (at least under identifiable conditions) as a measure of grain size or some other appropriate property; the gamma-ray log may well be the log of choice. The second stage 72 is the calculation of a measure of layer thickness over the interval; in the figure the cited measure is the statistic 1/L, calculated according to the method set out in the aforesaid U.S. Pat. No. 5,999,485. The input to this calculation may be the same gamma-ray log, or some other log, or a signal derived from seismic measurements. The third stage 73 (which may include visual display, for example in the juxtaposed form of FIG. 3) is directed at the identification of zones in which the sign of the slopes of the two curves is the same, and of those in which they are different. The fourth stage 74 involves the judgment that these zones are deposited under conditions where sediment exceeded accommodation, or accommodation exceeded sediment.

The clarity of the identification of zones in which the sign of the slopes of the two curves is the same (or different) may be improved by calculating the two slopes as a function of depth, and making a record showing where the signs are the same (or different). The indicator of sameness (or difference) may include multiplication as in the calculation of a cross-correlation coefficient as a function of depth. Other computational processes (not shown) may also be applied to improve the clarity of the indications; in particular, various forms of linear and nonlinear filtering known in the art may be found beneficial, as may the imposition of a threshold to eliminate judgments made where the slope is close to zero.

The output from FIG. 4a, therefore, is the segmentation of the interval into zones where sediment exceeded accommodation and accommodation exceeded sediment. This information is then available to be inserted into FIG. 4b.

FIG. 4b sets up the stages for calculating the synthetic stratigraphic cross-section, starting with the simple assumptions of FIG. 1 and then adding refinements. The first stage 75 defines each interval to be studied, between levels whose geological age is established with acceptable assurance (for example, by biostratigraphic dating). The second stage 76 identifies the corresponding intervals of a master sea-level chart, such as that given in "Mesozoic and Cenozoic Chronostratigraphy and Cycles of Sea-level Change", by Haq, Hardenbol and Vail, in SEPM Special Publication 42, "Sea-Level Changes. An Integrated Approach", 1988. The third stage 77 postulates a crude overall subsidence rate for each interval, such that the algebraic sum of this rate and the coeval variations of sea level yield the interval thickness observed between levels in stage 75. Then for the simple conditions of FIG. 1, the curve represented by the sum of this subsidence rate and the sealevel graph is the aggradation curve, and the height of the sediment pile.

Stages 78–80 set up initial postulates for the depositional conditions; these include the form of the substrate on which deposition commences at the start of the interval, the supply and properties of the sediment available, and the nature of the sorting expected during sediment transport and deposition. Stage 81 postulates an equilibrium angle for front sediments under the conditions expected; the box is dashed to indicate that this stage is necessary only for the later case of accommodation exceeding sediment.

Stage 82 is the construction of the "pilot" synthetic stratigraphic cross-section, from the aggradation curve output from stage 77. The vertical scale is that of this curve, while the horizontal scale is chosen for clarity of display. The orientation of the synthetic cross-section, of course, is not known, except insofar as it may be evident from the dipmeter log in the borehole or from seismic data or from local geological control. The construction may be done for a single interval, or for several consecutive intervals; in the latter case, and under the conditions of FIG. 1, the substrate 78 of any higher interval is the final aggraded surface of the previous interval.

It may be apparent from a visual appraisal of the synthetic cross-section that one or more of the postulated parameters 78–80 requires modification; this establishes the notion of feedback 86 from the cross-section to its postulates. This notion may be developed, and made quantitative, by stages 83–85.

Stage 83 is the calculation from the synthetic data of a synthetic sorting-property log at a chosen vertical (normally, of course, the borehole); if the sorting 80 is expected to operate on grain size, for example, the result is a synthetic grain-size log at the position of the borehole. (Counterparts may be added, for interest, at other verticals.) Stage 84 is the calculation of a synthetic depositional-rate log at a chosen vertical (normally, again, the borehole); this, as set out earlier, is normally the slope of the aggradation curve from stage 77 at the borehole (though again counterparts may be added at other verticals). Stage 85 then computes some measure of the match between the synthetic sorting-property log 83 and the actual sorting-sensitive log observed in the borehole; for example, this may be the computation of the cross-correlation coefficient between the synthetic grain-size log and the actual gamma-ray log, computed over a single interval or a plurality of intervals. Alternatively, or in addition, stage 85 may compute some measure of the match between the synthetic depositional-rate log 84 and an estimate of layer thickness obtained from a gamma-ray (or other) log in the borehole using the techniques of the aforesaid U.S. Pat. No. 5,999,485; for example, this may be the computation of the cross-correlation coefficient between the synthetic depositional-rate log 84 and a 1/L log calculated from the gamma-ray (or other) log in the borehole.

On the basis of this quantitative measure of the match between the real and synthetic data at the borehole, the values postulated in stages 78–80 may now be perturbed, under a geologist's control or mathematically, to improve and optimize the match. This is suggested by feedback link 89 into 86. The perturbation and iteration may also extend, by dotted link 87, to variations in the subsidence rate within the interval, or to refinements of the sealevel chart.

The final product, then, is an optimized synthetic stratigraphic cross-section 90, from which useful inferences may be made about the depositional environment of the sediments encountered in the borehole, and about the sediments that would be encountered if a new borehole were drilled at a distance from the original one.

Figure 5:
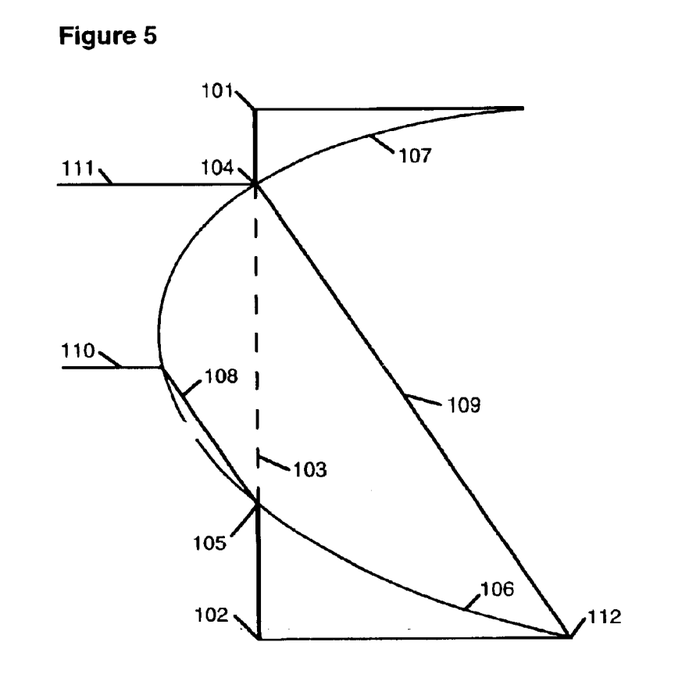
FIG. 5 adds detail to FIG. 2, in illustrating the construction of the synthetic stratigraphic cross-section for an interval that contains portions where the sediment exceeded the accommodation and a portion where accommodation exceeded sediment.

However, the validity of any such synthetic cross-section hinges on the issue of whether sediment exceeds accommodation. Therefore the technique of FIG. 4b is advantageously supplemented by that of FIG. 4a. In any interval or part of an interval in which the technique of FIG. 4a reveals a range of deposition with accommodation exceeding sediment, and with appearances compatible with slope or deep-water sedimentation, that range requires special treatment. FIG. 5 illustrates this.

In FIG. 5, 101 represents the top of the interval under study, and 102 the base, on a vertical representing the borehole. Within this interval, the segment 103, between limits 104 and 105, has been shown by the technique of FIG. 4a to have been deposited under conditions of accommodation exceeding sediment. Therefore the technique of FIG. 4b is modified (using the postulated value for the equilibrium angle in dashed box 81) to construct the depositional surfaces 108 and 109 in FIG. 5. The depositional front 108 is constructed as a surface rising landward from point 105, and the front 109 as a surface falling basinward from point 104, both at the equilibrium angle. Since the point 105 represents the exhaustion of sediments deposited to the left of 105 under conditions of sediment exceeding accommodation, the unconformity surface 106 may be constructed for earlier times back to that corresponding to the marker 102, and the continuation of this unconformity surface as the locus of the break point 107 may be constructed for times up to that corresponding to marker 101. The intersection of the constructed front surface 108 with the locus 107 defines the corresponding near-horizontal surface 110, on which sediments were deposited with sediment exceeding accommodation. The time of this surface 110 may be obtained by projection on to the aggradation curve, as in FIG. 1; this yields the geologic age of the front sediments that downlap on to the unconformity surface 106 at point 105 (and hence the duration of the hiatus that occurred at this point). Similarly, the time of the depositional surface 109 is that of point 104, which is that of near-horizontal surface 111 (also obtained by projection on to the aggradation curve); this establishes the duration of the hiatus at the downlap point 112.

Thus, within the interval 101 to 102, the geologic age of all sediments deposited between 102 and 105, and between 104 and 101, may be found directly from the aggradation curve, while the geologic age of all sediments between 105 and 104 may be found by constructing fronts similar to 108 and 109 back to the locus 107, and timing the intersection points from the aggradation curve. This procedure also allows the deposition rate to be calculated for all parts of the interval; the rate is generally much larger between points 105 and 104, of course, than between 102 and 105 or between 104 and 101.

The diversity of systems of sediment deposition is enormous. However, all these systems are responses to the pervasive force of gravity, and in that sense there is a simplicity underlying the complexity. The present invention seeks to exploit the underlying simplicity by: using biostratigraphic markers to establish analysis intervals; obtaining the subsidence of the base of an interval from the interval thickness and a sea-level chart; determining whether sediment exceeded accommodation or accommodation exceeded sediment from the signs of the slopes of the gamma-ray log and the 1/L log; and perturbing the other variables in the depositional system on a quantitative criterion of geological plausibility. It is stressed that this scheme is capable of extension to depositional variables beyond those discussed above. (For example, the hingeing of the entire depositional system about a point to landward may be accommodated, as can the development of fans at the toe of front sediments, and the erosion of landward sediments, during times of falling sea level.) It should be understood that the scope of the invention includes such derivative applications.

It should also be understood that all the waveforms used or developed in the practice of the invention may be subjected to a wide variety of data-processing manipulations without departing from the scope of the invention. Included, without limitation, are various forms of linear and nonlinear filtering, the preparation of spectral displays, the use of products and cross-plots for the identification of common signs, the use of variants of the statistic L for the estimation of depositional rate or layer thickness, and the making of different forms of graphic display.

It should further be understood that the borehole data employed in the practice of the invention is not limited to the particulars described above, but may include any of the full gamut of logs and other measurements made in a borehole. It is also stressed that the invention may be applied cooperatively with such other measurements, thus facilitating the interpretation of the corpus of all borehole data. Particular benefit derives from the ability of the invention to recognize and date unconformities in the rock succession; these are often very difficult to detect in logs and in lithologic measurements.

It should further be understood that the practice of the invention may be aided by seismic reflection data. In particular, seismic cross-sections traversing the borehole (and walkaway vertical seismic profiles made in the borehole) may be of major utility in strengthening the criterion of geological plausibility. Again there may be cooperative benefit, in that the invention brings a new degree of detail to the interpretation of seismic sections, a new ability to identify unconformities, and a new method of tying seismic reflections to sea-level cycles.

What is claimed is:

1. A method for distinguishing rock layers that were deposited while the rate of supply of sediment exceeded the rate of increase of accommodation space from rock layers that were deposited while the rate of increase of accommodation space exceeded the rate of supply of sediment, said method comprising the steps of:
   (a) selecting a first physical property of rock and a second physical property of rock from those sedimentary rock properties expected to show a variation arising from cyclic geological processes;
   (b) obtaining measurements of said first physical property as a function of depth;
   (c) obtaining measurements of said second physical property as a function of depth;
   (d) manipulating said measurements of said second physical property to obtain an estimate of rock layer thickness as a function of depth;
   (e) determining a slope of said first physical property as a function of depth and a slope of said estimate as a function of depth;
   (f) identifying first-type zones and second-type zones, wherein for said first-type zones said slope of said first physical property is equal in sign to said slope of said estimate and wherein for said second-type zones said slope of said first physical property is opposite in sign from said slope of said estimate;
   (g) using said first-type zones and said second-type zones to distinguish between (1) periods during which said rate of supply of sediment exceeded said rate of increase of accommodation space and (2) periods during which said rate of increase of accommodation space exceeded said rate of supply of sediment.

2. The method according to claim 1, in which said first physical property is also required to be one of those sedimentary properties that are affected by sediment sorting during sediment transport and deposition.

3. The method according to claim 1, in which said said first physical property and said second physical property are identical.

4. The method according to claim 3, in which said measurements of said first physical property as a function of depth consist of a gamma-ray log.

5. The method according to claim 1, in which said manipulating involves calculating a first moment of a power spectrum of a wavenumber of said measurements of said second physical property within a sliding window as a function of depth.

6. The method according to claim 1, in which measurements of both said first physical property and of said second physical property are obtained from seismic reflection traces.

7. The method according to claim 1, in which a visual identification of said first-type zones and of said second-type zones is aided by juxtaposing a graph of said measurements of said first physical property and a graph of variations of said estimates, each as a function of depth.

8. The method according to claim 1, in which a visual identification of said first-type zones and of said second-type zones is aided by a graph of said slope of said measurements of said first physical property and a graph of said slope of said estimate, each as a function of depth.

9. The method according to claim 1, in which identification of said first-type zones and of said second-type zones is aided by calculating a cross-correlation coefficient between first said physical property and said estimate, respectively.

10. The method according to claim 1, in which identification of said first-type zones and of said second-type zones is aided by calculating a cross-correlation coefficient between a surrogate for said first physical property and a surrogate for said estimate, respectively.

11. A method of determining the likely depositional environment of sedimentary rocks penetrated by a borehole, said method being based on constructing a synthetic stratigraphic cross-section traversing said borehole from one or more actual logs run in said borehole, said method comprising the following steps:
   (a) identifying a plurality of marker levels within said borehole, wherein for each of said marker levels a geological age of deposition is known from biostratigraphical evidence;
   (b) identifying a plurality of intervals, each of said intervals being limited by adjacent members of said plurality of markers, whereby a plurality of interval thicknesses are defined, and wherein each of said intervals has an interval base defined by a lower of said adjacent members;
   (c) using said interval thicknesses and a sea-level cycle chart to obtain a local variation of sea level relative to said interval base of each of said intervals, postulating initially that subsidence was constant during said interval;
   (d) postulating a cross sectional form of a depositional substrate for each of said intervals, wherein said substrate may conform to an upper depositional surface constructed for one or more previous intervals;
   (e) postulating a reasonable rate of supply of sediment, initially taking said rate of supply to be constant during deposition of said each of said intervals;

(f) postulating an initial range of a sediment property, such as grain size, likely to induce sorting during sediment transport and deposition;

(g) postulating an initial value for an equilibrium angle of a sloping depositional surface for said sediment deposited while a rate of increase of accommodation space exceeded said rate of supply of sediment;

(h) using the method of claim 1, to determine where, in said each of said intervals, said rate of supply of sediment exceeded said rate of increase of accommodation space and where in said each of intervals said rate of increase of accommodation space exceeded said rate of supply of sediment;

(i) constructing, from results of preceding steps, one or more synthetic stratigraphic cross-sections of rocks deposited during said each of said intervals, subject to a constraint that said cross-sections must satisfy all data from said borehole;

(j) assessing said cross-sections with respect to geological plausibility;

(k) iterating said cross-sections toward improved geological plausibility by varying each input datum previously postulated, selecting a best synthetic stratigraphic cross-section based on geological plausibility.

12. The method according to claim 11, in which said geological plausibility is assessed by observing a degree to which each of said cross-sections is consistent with seismic data.

13. The method according to claim 11, in which said geological plausibility is assessed by observing a degree to which cross-section layer thicknesses match borehole layer thicknesses deduced from cuttings in said borehole.

14. The method according to claim 11, in which said geological plausibility is assessed by observing a degree to which sediment properties of each of said cross-sections vary consistently with lithology observed in said borehole.

15. The method according to claim 11, in which calculated variations of sediment properties over said each of said intervals are used to construct a synthetic sediment-property log, and in which a measure of geological plausibility is assessed by calculating a cross-correlation coefficient between said synthetic sediment-property log and said actual logs.

16. The method according to claim 11, in which said geological plausibility is assessed by observing a degree to which each of said cross-sections is consistent with data from one or more boreholes.

17. The method according to claim 11, in which said geological plausibility is assessed by observing a degree to which each of said cross-sections is consistent with data from outcrop studies.

18. A method for distinguishing, in a bore hole penetrating layers of sedimentary rock, excess rocks from deficit rocks, excess rocks having been deposited while the rate of supply of sediment exceeded the rate of increase of accommodation space and deficit rocks having been deposited while the rate of increase of accommodation space exceeded the rate of supply of sediment, by using a gamma ray log of said borehole, said method comprising the steps of:

(a) calculating a gamma-ray slope of said gamma ray log as a function of depth;

(b) calculating a wavenumber of said gamma ray log as a function of depth;

(c) calculating a first moment of a power spectrum of said wave number;

(d) equating a layer-thickness slope to a slope of a reciprocal of said first moment of said power spectrum;

(e) calculating a cross-correlation coefficient between said layer-thickness slope and gamma-ray slope as a function of depth;

(f) identifying excess rocks as those rocks penetrated by portions of said bore hole where said cross-correlation coefficient is positive;

(g) identifying deficit rocks as those rocks penetrated by portions of said bore hole where said cross-correlation coefficient is negative.

* * * * *

UNITED STATES PATENT AND TRADEMARK OFFICE
CERTIFICATE OF CORRECTION

PATENT NO. : 6,721,661 B2
DATED : April 13, 2004
INVENTOR(S) : Nigel A. Anstey and Ronan Francis O'Doherty It is certified that error appears in the above-identified patent and that said Letters Patent is hereby corrected as shown below:

Column 2,
Line 28, "(c) " should be -- (e) --

Column 6,
Line 25, "thaAlong" should read -- than that on near-horizontal surface 21". Along --
Line 30, "FIG. 2n that on near-horizontal surface 21." should read "FIG. 2. --

Column 12,
Line 34, "first said" should be -- said first --

Signed and Sealed this

Seventh Day of December, 2004

JON W. DUDAS
*Director of the United States Patent and Trademark Office*